United States Patent [19]
Horibe

[11] Patent Number: 4,493,243
[45] Date of Patent: Jan. 15, 1985

[54] VACUUM SUSPENDED TYPE SERVO DEVICE

[75] Inventor: Osamu Horibe, Atsugi, Japan

[73] Assignee: Nissan Motor Company, Limited, Yokohama, Japan

[21] Appl. No.: 499,251

[22] Filed: May 31, 1983

[30] Foreign Application Priority Data

Jun. 16, 1982 [JP] Japan ................... 57-102162

[51] Int. Cl.$^3$ .............................. F15B 9/10
[52] U.S. Cl. ................... 91/369 B; 91/376 R
[58] Field of Search ............ 91/369 B, 369 R, 369 A, 91/376 R

[56] References Cited

U.S. PATENT DOCUMENTS

| | | | |
|---|---|---|---|
| 3,009,445 | 11/1961 | Wuellner | 91/369 B |
| 3,009,449 | 11/1961 | Rike | 91/369 B |
| 3,033,173 | 5/1962 | Bauman | 91/369 B |
| 3,209,658 | 10/1965 | Randol | 91/369 B |
| 3,952,518 | 4/1976 | Pech et al. | 91/369 B |
| 4,095,509 | 6/1978 | Tateoka et al. | 91/369 B |
| 4,100,838 | 7/1978 | Tateoka et al. | 91/369 B |

FOREIGN PATENT DOCUMENTS 2441631 8/1973 Fed. Rep. of Germany .

Primary Examiner—Paul E. Maslousky
Attorney, Agent, or Firm—Leydig, Voit, Osann, Mayer and Holt, Ltd.

[57] ABSTRACT

In a vacuum suspended type servo device, there is arranged a power ratio adjusting means for adjusting the power multiplying characteristic of the servo device to a desired degree. The power ratio adjusting means comprises a reaction lever having a bent portion which is pivotally seated on the power piston to act as a fulcrum of the reaction lever, a plunger member movable with an input member to which an input force is applied when a brake pedal is depressed, the plunger member having a shoulder portion to which one end of the reaction lever is engaged when the reaction lever pivots to a certain degree, a support member fixed to an output member connected to the master cylinder piston, a reaction member movably supported by the support member, the reaction member having a projection which is in contact at its top end with the reaction lever, and an electrically actuated moving means for moving the reaction member so that the projection of the reaction member is movable along the axis of the reaction lever between the end of the lever and the bent portion of the lever.

6 Claims, 8 Drawing Figures

VACUUM SUSPENDED TYPE SERVO DEVICE

BACKGROUND OF THE INVENTION

The present invention relates in general to a brake booster which permits the driver to easily brake the vehicle by exerting only a little pressure on the brake pedal, and more particularly to a vacuum suspended type servo device which utilizes the pressure difference between the vacuum in the engine intake manifold and atmospheric pressure in order to increase the brake power applied to the brake master cylinder piston.

SUMMARY OF THE INVENTION

According to the present invention, there is provided an improved vacuum suspended type servo device which is provided with a power ratio adjusting means by which the power multiplying characteristic of the servo device is adjustable to a desired value.

According to the present invention, there is provided a vacuum suspended type servo device which comprises a housing, a power piston movable with a diaphragm which is disposed in the housing to divide the interior of same into first and second chambers, the first chamber being communicated with a vacuum source, the second chamber being communicable with the atmosphere, an input member to which an input force is applied, an output member to which the movement of the power piston is transmitted under a certain condition, a valve means for providing a communication between the second chamber and the atmosphere when the input member moves beyond a certain degree in response to application of the input force thereto, and a power multiplying device interposed between the power piston and the output member to multiply the power which is applied to the output member from the power piston, wherein the power multiplying device includes a power ratio adjusting means by which the power multiplying ratio of the power multiplying device is adjustable to a desired value.

BRIEF DESCRIPTION OF THE DRAWINGS

Objects and advantages of the present invention will become apparent from the following description when taken in conjunction with the accompanying drawings, in which.

DETAILED DESCRIPTION OF THE INVENTION

Prior to describing the invention, a conventional vacuum suspended type servo device will be described with reference to FIG. 1 in order to clarify a drawback which can be solved by the present invention.

Figure 1:
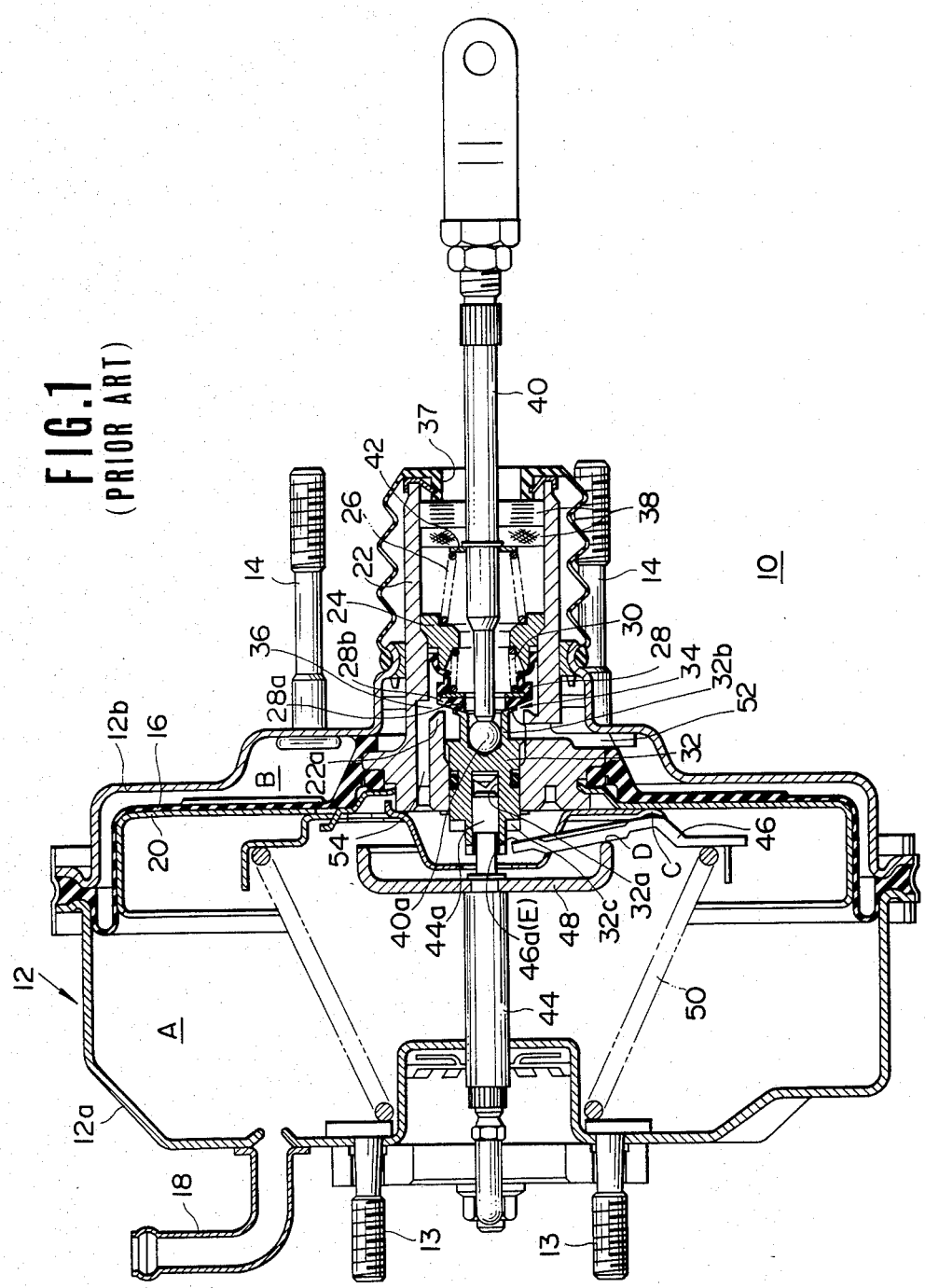
FIG. 1 is a sectional view of a conventional vacuum suspended type servo device.

Referring to FIG. 1, there is shown one of the conventional vacuum suspended type servo devices, which is generally designated by numeral 10. The servo device 10 comprises a housing 12 consisting of two cup-shaped bodies 12a and 12b which are sealingly coupled with each other to define therein a chamber. The body 12a is connected to a master cylinder (not shown) of a hydraulic brake system by means of supporting struts 13. The body 12b is connected to the vehicle body (not shown) by means of supporting struts 14. The interior of the housing 12 is divided into first and second chambers A and B by a diaphragm 16 supported at its peripheral portion by the mating portions of the bodies 12a and 12b of the housing 12. The chamber A is communicated with the interior of an intake manifold (not shown) of an internal combustion engine. For this purpose, a connecting pipe 18 is provided to the body 12a. Thus, under operation of the engine, the chamber A is kept in a negative pressure. The other chamber B is selectively communicated with either the chamber A or the atmosphere by the function of an afterdescribed valve mechanism. The diaphragm 16 carries thereon a tubular power piston 20 to move therewith axially. To the central hub portion of the diaphragm 16 is fixed a sleeve member 22 at its one axial end. Within the sleeve member 22, there is stationarily disposed a support member 24 on one side of which is seated a coil spring 26. To the other side of the support member 24, an axially expandable valve member 28 (constructed of, for example, a rubber material) is mounted. A coil spring 30 is disposed in the valve member 28 and compressed between the support member 24 and the head portion of the valve member 28 so that the head portion is biased leftward in the drawing (FIG. 1). The top 28a of the head portion of the valve member 28 is contactable with a collar portion 32b of a valve plunger 32 which is coaxially movably and sealingly held in the left portion of the sleeve member 22. With this, an air valve arrangement 34 is formed as will become clear as the description proceeds. As shown in the drawing, the leading end of the collar portion 32b is formed into a valve seat for assuring the function of the air valve arrangement. The peripheral portion 28b of the head portion of the valve member 28 is contactable with an inwardly projecting annular end 22a of the sleeve member 22. With this, a vacuum valve arrangement 36 is provided as will become clear as the description proceeds. The interior of the sleeve member 22 is communicated with the atmosphere through an opening 37 defined by the sleeve member 22. An air filter unit 38 is disposed in the sleeve member 22 to clean air which is introduced into the sleeve member 22.

An input rod 40 is inserted in the sleeve member 22 and put at its spherical head portion 40a in the collar portion 32b of the valve plunger 32. The other end, that is, the right end of the input rod 40 is connected via a suitable link mechanism to a brake pedal (not shown) so that the input 40 is axially movable leftward or rightward in response to depression or release of the brake pedal. A spring seat 42 is mounted on the input rod 40 for supporting the other end of the spring 26, so that the leftward movement of the input rod 40 is achieved against the biasing force of the spring 26.

An output rod 44 is coaxially disposed in the chamber A. The rod 44 has a reduced diameter extension 44a which is axially slidably received in an axial bore 32a formed in the valve plunger 32. Angularly equally spaced three reaction levers 46 (only one is shown) are arranged so that their bent portions (no numerals) are seated on the power piston 20 at points C. An annular reaction plate 48 is coaxially mounted to the output rod 44 to move therewith. The peripheral bent portion of the reaction plate 48 contacts with the reaction levers 46 at points D. A larger compression spring 50 is arranged in the chamber A to bias the reaction levers 46 and thus the power piston 20 rightward in the drawing.

Although not shown in the drawing, the output rod 44 connects at its leftwardly projecting end with a master cylinder piston to operate the master cylinder of the hydraulic brake system.

In the following, operation of the servo device 10 will be described.

Under a condition wherein the brake pedal is not depressed, the parts of the servo device 10 assume the illustrated positions wherein the top 28a of the valve member 28 contacts with the collar portion 32b (namely, valve seat) of the valve plunger 32 causing the air valve arrangement 34 to assume its closed position, and wherein the peripheral portion 28b of the valve member 28 is disengaged from the inwardly projected end 22a of the sleeve member 22 causing the vacuum valve arrangement 36 to assume its open position. It is to be noted that under this rest condition, the flexible tubular portion of the valve member 28 is kept contracted against the force of the spring 30. With the air valve arrangement 34 being in its closed position, the communication between the chamber B and the atmosphere through the conduit 52, the interior of the sleeve member 22 and the air induction opening 37 is blocked. While, with the vacuum valve arrangement 36 being in its open position, the communication between the two chambers A and B is established through the conduit 54, the annular space about the collar portion 32b of the valve plunger 32 and the conduit 52. Thus, under operation of the engine, the two chambers A and B are exposed to equal negative pressure, so that the diaphragm 16 and thus the power piston 20 assume their right positions (in the drawing) by only the action of the biasing spring 50.

When, under operation of the engine, the brake pedal is depressed to a small degree, the input rod 40 is slightly moved leftward moving the valve plunger 32 in the same direction relative to the output rod 44. With this action, the tubular portion of the valve member 28 is expanded sufficiently by the action of the spring 30, bringing the peripheral portion 28b of the valve member 28 into contact with the inwardly projected end 22a of the sleeve member 22. This induces the closed condition of the vacuum valve arrangement 36. Thus, the communication between the chambers A and B is now blocked.

When the brake pedal is further depressed to such a degree that the collar portion 32b (namely, the valve seat of the portion 32b) of the valve plunger 32 is disengaged from the top 28a of the valve member 28, the air valve arrangement 34 becomes open thereby establishing the communication between the chamber B and the atmosphere. Thus, the atmospheric air is introduced into the chamber B, causing the pressure in the chamber B to become higher than that in the chamber A. With the pressure difference thus produced between the chambers A and B the diaphragm 16 and thus the power piston 20 move leftward against the force of the spring 50. With this movement, each reaction lever 46 is forced to pivot clockwise (in the case of the illustrated reaction lever 46) about the point C, keeping abutment with the peripheral bent portion of the reaction plate 48 at the point D. In fact, under this movement, the output rod 44 and thus the reaction plate 48 do not move because of a counter-force produced by the master cylinder (not shown) to which the output rod 44 is connected.

When, due to further depression of the brake pedal, each reaction lever 46 pivots to the final position where the inward end 46a (or E) thereof contacts with a shoulder portion 32c of the valve plunger 32, the reaction plate 48 and thus the output rod 44 become ready for moving leftward. Thus, thereafter, the output rod 44 is moved leftward together with the power piston 20.

With this operation, most the work required for braking the vehicle is effected by the power piston 20. In other words, the device 10 permits the driver to easily brake the vehicle by exerting only a little pressure on the brake pedal. The counter-force applied to the output rod 44 by the master cylinder piston is transmitted through the reaction plate 48, and the reaction levers 46 to the input rod 40, so that the driver can feel or detect the output of the servo device 10 through his or her hoot putting on the brake pedal.

In practical use, however, the above-mentioned conventional servo device has a following weak point. That is, even though the brake pedal is depressed in substantially the same manner, the resulting braking effect will vary notably in accordance with the variation in gross weight of the vehicle. Thus, the driver often feels unsatisfactory in effecting assured braking of the vehicle.

Therefore, it is an essential object of the present invention to provide an improved vacuum suspended type servo device which is free of the above-mentioned weak point. As will become apparent as the description proceeds, in the servo device of the present invention, the power multiplying ratio which is the ratio of the output produced by the servo device to the input applied to the brake pedal by the driver can be changed in accordance with the gross weight of the vehicle. In the conventional servo device 10 hereinabove described, the power multiplying ratio is fixed. In fact, the fixed ratio of the conventional one is determined by the dimensions of the reaction levers 46 and the reaction plate 48, that is, by the ratio of the distance between the point C and point E to the distance between the point C and point D, which are fixed.

In the following, the present invention will be described with reference to FIGS. 2 to 8 of the drawings.

Figure 2:
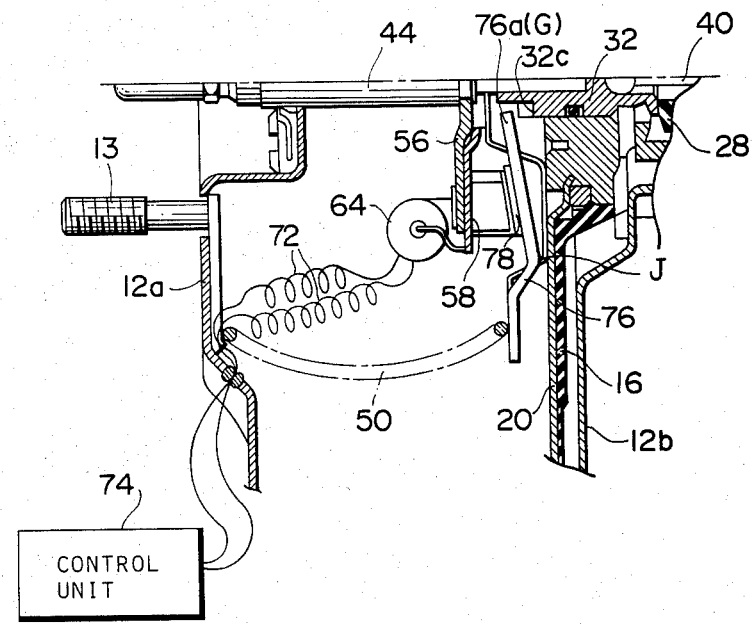
FIG. 2 is a partial, sectional view of a vacuum suspended type servo device of the present invention, showing an essential part of it.
Figure 3:
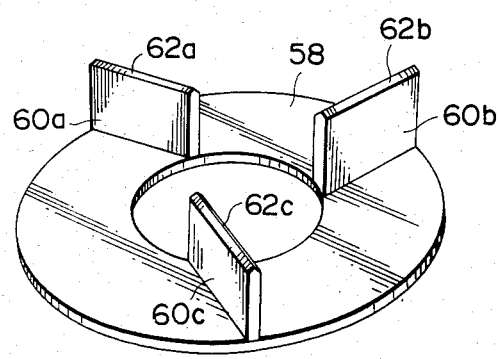
FIG. 3 is a partial, perspective view of an annular reaction plate employed in the present invention.

Referring to FIG. 2, there is shown an essential portion of a vacuum suspended type servo device according to the present invention. Identical parts and similar parts to those in FIG. 1 are designated by the same numerals.

In the present invention, an annular support plate 56 is coaxially and securely mounted on the output rod 44 to move therewith. As is seen from FIG. 2, the plate 56 has an annular depressed portion which faces toward the input rod 40. An annular reaction plate 58 is slidably and coaxially rotatably seated on the depressed portion of the annular support plate 56. As is well shown in FIG. 3, the reaction plate 58 is formed at its one side with angularly equally spaced three projections 60a, 60b and 60c each standing at right angles on the plate 58. The top portion of each projection is gradually reduced in thickness to form a knife-edge shape 62a, 62b or 62c. Each projection 60a, 60b or 60c is oriented so that the axis of it deviates by a certain angle from the radial direction of the plate 58 by the reason which will become apparent hereinafter.

Figure 4:
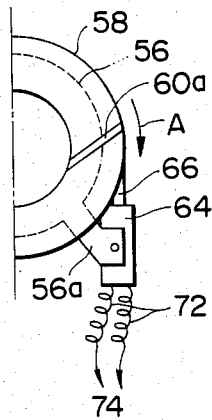
FIG. 4 is a right-half front view of a unit comprising the annular reaction plate and a solenoid.
Figure 5:
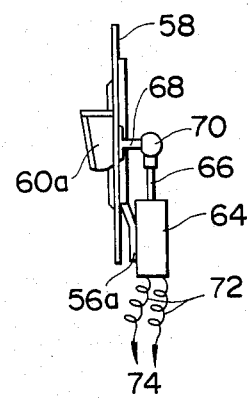
FIG. 5 is a side view of the unit.
Figure 6:
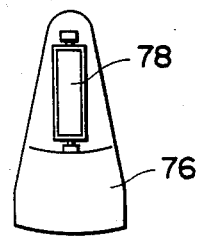
FIG. 6 is a plan view of a reaction lever.

At the left side of the reaction plate 58 (see FIG. 2), there is mounted a solenoid 64 which is secured to a radially outwardly projected portion 56a of the annular support plate 56 (see FIG. 4). As is seen from FIG. 5, the solenoid 64 has a plunger 66 which is axially movable in accordance with the magnitude of current flowing in the solenoid 64. The leading end of the plunger 66 is pivotally connected to the annular reaction plate 58 at the opposed side relative to the side on which the projection 60 is mounted. For the pivotal connection between the plunger 66 and the reaction plate 58, a stud 68 extending from the reaction plate 58 and a stud catcher 70 fixed to the plunger 66 are employed, these members 68 and 70 thus constituting a so-called ball joint as is seen from FIG. 5. Lead lines 72 of the solenoid 64 extend to a known control unit 74 (see FIG. 2) at which the current applied to the solenoid 64 is controlled. In the invention, the control unit 74 may comprise a variable resistor which is interposed between an electric power source (or battery) and the solenoid 64. By manually operating the variable resistor, the current applied to the solenoid 64 changes thereby changing the position of the plunger 66 and thus the angular position of the annular reaction plate 58 relative to the annular support plate 56. More particularly, when the current applied to the solenoid 64 increases, the reaction plate 58 rotates in the direction of the arrow A of FIG. 4 due to the drawing movement of the plunger 66.

Similar to the afore-mentioned conventional device, angularly equally spaced three reaction levers 76 (only one is shown in the drawings) are arranged in a manner to be seated at their bent portions (no numerals) on the power piston 20 at points J. The inwardly leading end 76a (G) of each reaction lever 76 is brought into contact with a shoulder portion 32c of the valve plunger 32 when the reaction lever 76 pivots clockwise (in FIG. 2) about the point J to a certain degree. As is best seen from FIG. 6, each reaction lever 76 is equipped with an elongate roller 78 which lies along the longitudinal axis of the reaction lever 76 and is rotatable about the axis thereof. As is understood from FIG. 2, the three reaction levers 76 are positioned to respectively face the three projections 60a, 60b and 60c of the annular reaction plate 58 so that the roller 78 of each reaction lever 76 is in contact with the knife-edge portion 62a, 62b or 62c of the corresponding projection 60a, 60b or 60c of the annular reaction plate 58. Because each projection 60a, 60b or 60c is angled from the radial direction of the plate 58 as has been described hereinafore, the contact between the projection 60a, 60b or 60c and the corresponding roller 78 makes a point contact therebetween as is seen from FIG. 7. It is thus to be noted that when the annular reaction plate 58 rotates about its axis, the contact point H (see FIG. 7) between them moves in the radial direction of the annular reaction plate 58.

Figure 7:
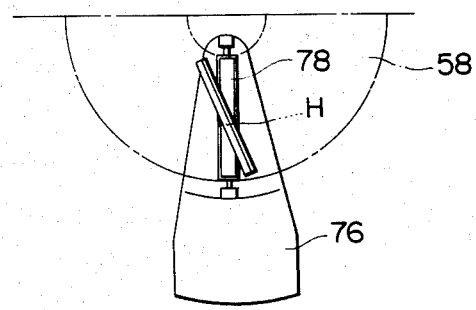
FIG. 7 is an illustration showing the positional relationship between a rectangular projection of the reaction plate and a roller on the reaction lever.
Figure 8:
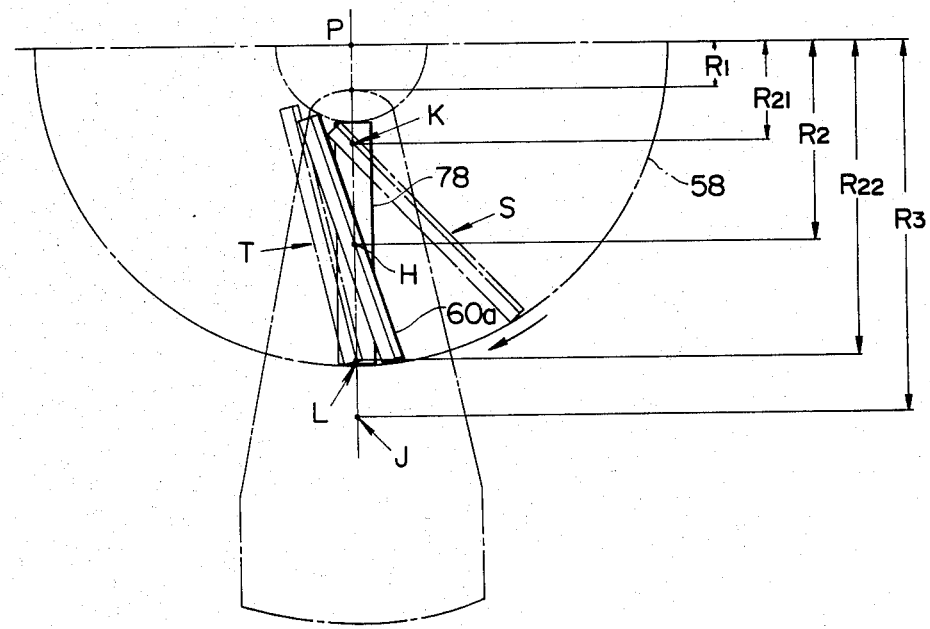
FIG. 8 is an enlarged view similar to FIG. 7, but showing the manner how the rectangular projection of the reaction plate moves relative to the roller.

In the following, operation of the servo device of the present invention will be described with reference to FIGS. 2 and 7. The three units each comprising the projection 60a, 60b or 60c and the corresponding reaction lever 76 having the roller 78 thereon operate in substantially the same manner. Thus, the following description will be directed to only the illustrated one unit. Further, in order to facilitate the description, the inwardly leading end 76a of the reaction lever 76 is designated by G, the contact point between the projection 60a, 60b or 60c and the roller 78 is by H, the position where the reaction lever 76 is seated on the power piston 20 is by J, a portion of the axis of the reaction plate 58 is by P, the distance between the portions P and G is by $R_1$, the distance between the portions P and H is by $R_2$, and the distance between the portions P and J is by $R_3$. When using the above-mentioned references, the following equation is given for representing the power multiplying ratio of the servo device:

$$\text{Power multiplying ratio} = \frac{F_o}{F_i} \approx \frac{R_3 - R_1}{R_3 - R_2} \quad (1)$$

wherein, $F_i$ is a force applied to the valve plunger 32 in response to the depression of the brake pedal, and $F_o$ is a force given to the output rod 44.

When the gross weight of the vehicle is small, the driver operates the control unit 74 to apply the solenoid 64 with a less current. With this operation, the plunger 66 of the solenoid device 64 is moved to rotate the annular reaction plate 58 and thus the projection 60a thereof to the position indicated by reference S (see FIG. 8). With this rotation, the contact point H between the projection 60a and the roller 78 comes to the position indicated by reference K, which is near the point P. Thus, in this case, the distance $R_{21}$ between the contact point H and the point P takes its smallest value, causing the term ($R_3-R_2$) of the above equation (1) to take its largest value. Thus, the power multiplying ratio, that is $F_o/F_i$, takes its smallest value.

When, on the contrary, the gross weight of the vehicle is great, the driver operates the control unit 74 to apply the solenoid 64 with a larger current. With this action, the annular reaction plate 58 is rotated, by the plunger 66 of the solenoid device 64, to a position where the projection 60a assumes its position as indicated by reference T. With this rotation, the contact point H between the projection 60a and the roller 78 comes to the position indicated by reference L, which is farmost from the point P. Thus, in this case, the distance $R_{22}$ between the contact point H and the point P takes its largest value, causing the term ($R_3-R_2$) of the equation (1) to take its smallest value. Thus, the power multiplying ratio, that is $F_o/F_i$, takes its largest value.

Thus, by handling the control unit 74 so as to apply the solenoid 64 with a desired magnitude of current, the contact point H comes to a desired position. Thus, in the servo device of the present invention, variable power multiplying ratios can be obtained, by only handling the control unit 74, in accordance with the variation of the gross weight of the vehicle.

If desired, the following modifications may be employed in the invention. As a substitute for the above-stated roller 78, an elongate stand member fixed to the reaction lever 60a, 60b or 60c may be used, which lies along the axis of the lever. In this case, however, the stand member and the projection 60a, 60b or 60c are preferably made of wear-resistant material. Further, the control unit 74 may be so constructed as to automatically vary the current applied to the solenoid 64 with variation of the vehicle speed or the engine speed. Furthermore, a known hydraulic device and/or pneumatic device may be used for actuating the annular reaction plate 58, in place of the above-stated solenoid device 64.

What is claimed is:

1. A vacuum suspended type servo device comprising:

a housing;

a power piston movable in said housing;

an input member to which an input force is applied;

an output member to which the movement of said power piston is transmitted;

valve means operated by said input member to control the movement of said power piston;

force transmitting means interposed between said input member, said power piston, and said output member;

said force transmitting means including a reaction lever having a bent portion which is pivotally seated on said power piston to act as a fulcrum of said reaction lever;

a plunger member movable with said input member, said plunger member having a shoulder portion to which one end of said reaction lever is engaged when said reaction lever pivots to a certain degree;

a support member fixed to said output member to move therewith;

a reaction member movably supported by said support member, said reaction member including an elongated member which extends at an angle relative to said reaction lever and contacts at one side thereof with said reaction lever; and moving means for moving said reaction member rotationally to shift the point of contact radially along said reaction lever.

2. A vacuum suspended type servo device as claimed in claim 1 wherein said moving means comprises:
   a solenoid supported by said support member;
   a plunger movable in response to energization and de-energization of said solenoid; and
   connecting means connecting said plunger with said reaction member thereby to transmit the movement of said plunger to said reaction member.

3. A vacuum suspended type servo device as claimed in claim 2 wherein said reaction member comprises an annular plate which is slidably mounted on said support member and rotatable about the axis of said output member, and wherein said elongated member extends at right angles from said annular plate to be in contact as its top end with aid reaction lever.

4. A vacuum suspended type servo device as claimed in claim 3 wherein said reation lever is equipped with an elongate roller which lies along the axis of said reaction lever and is rotatable about the axis thereof relative to said reaction lever, said top end of said elongated member of said reaction member being in contact with the cylindrical portion of said roller.

5. A vacuum suspended type servo device as claimed in claim 4 wherein top end of said elongated member is gradually reduced in thickness thereby to form a knife-edge shape.

6. A vacuum suspended type servo device as claimed in claim 5 wherein said elongated member is oriented so that the knife-edge deviates by a certain angle from the radial direction of said annular plate.

* * * * *